United States Patent
Pasquet et al.

(10) Patent No.: US 11,498,540 B2
(45) Date of Patent: Nov. 15, 2022

(54) BRAKE ACTUATOR AND ASSOCIATED CONTROL METHOD

(71) Applicant: FOUNDATION BRAKES FRANCE, Drancy (FR)

(72) Inventors: Thierry Pasquet, Vincennes (FR); Abdessamed Ramdane, Beauvais (FR)

(73) Assignee: FOUNDATION BRAKES FRANCE, Drancy (FR)

(*) Notice: Subject to any disclaimer, the term of this patent is extended or adjusted under 35 U.S.C. 154(b) by 246 days.

(21) Appl. No.: 16/957,653

(22) PCT Filed: Dec. 28, 2018

(86) PCT No.: PCT/FR2018/053566
§ 371 (c)(1),
(2) Date: Jun. 24, 2020

(87) PCT Pub. No.: WO2019/135047
PCT Pub. Date: Jul. 11, 2019

(65) Prior Publication Data
US 2020/0361438 A1    Nov. 19, 2020

(30) Foreign Application Priority Data

Jan. 2, 2018 (FR) .................................... 1850013

(51) Int. Cl.
*B60T 13/00* (2006.01)
*B60T 13/74* (2006.01)
(Continued)

(52) U.S. Cl.
CPC .......... *B60T 13/746* (2013.01); *B60T 17/221* (2013.01); *F16D 65/18* (2013.01); *F16D 66/00* (2013.01);
(Continued)

(58) Field of Classification Search
CPC ............ F16D 2125/40; F16D 2121/24; F16D 2066/005; F16D 65/18; F16D 66/00; B60T 13/746; B60T 17/221
See application file for complete search history.

(56) References Cited

U.S. PATENT DOCUMENTS

| 6,220,676 B1* | 4/2001 | Rudd, III .............. B64C 25/44 303/112 |
| 2005/0001474 A1* | 1/2005 | Zierolf ................... B60T 8/325 303/112 |

(Continued)

FOREIGN PATENT DOCUMENTS

| CN | 102785648 A | 11/2012 |
| EP | 0894685 A2 | 2/1999 |
| EP | 1885054 A1 | 2/2008 |

OTHER PUBLICATIONS

International Search Report for PCT/FR2018/053566 dated May 9, 2019.
(Continued)

*Primary Examiner* — Nicholas J Lane
(74) *Attorney, Agent, or Firm* — Pearne & Gordon LLP

(57) ABSTRACT

A brake actuator comprising a DC motor, a computer configured for: measuring, over time, a current drawn by the motor and a voltage between the terminals of the motor; implementing a Kalman filter in order to compute, from the measured current and voltage, a filtered current drawn by the motor and a filtered rotational speed of a shaft of the motor; computing, from the value of the filtered current and the value of the filtered rotational speed, a clamping force that is produced by the actuator; controlling the motor such that it stops when the computed value of the clamping force reaches a predetermined setpoint value.

7 Claims, 1 Drawing Sheet

(51) Int. Cl.
  *B60T 17/22* (2006.01)
  *F16D 65/18* (2006.01)
  *F16D 66/00* (2006.01)
  *F16D 121/24* (2012.01)
  *F16D 125/40* (2012.01)

(52) U.S. Cl.
  CPC .... *F16D 2066/005* (2013.01); *F16D 2121/24* (2013.01); *F16D 2125/40* (2013.01)

(56) References Cited

U.S. PATENT DOCUMENTS

| | | |
|---|---|---|
| 2005/0007044 A1 | 1/2005 | Qiu et al. |
| 2014/0156144 A1 | 6/2014 | Hoshi et al. |
| 2015/0239439 A1* | 8/2015 | Sussek .................... B60T 8/172 |
| | | 701/70 |
| 2019/0003535 A1 | 1/2019 | Esnee et al. |
| 2020/0102008 A1 | 4/2020 | Pasquet |
| 2021/0024044 A1* | 1/2021 | No ............................ G01L 5/26 |
| 2021/0265936 A1* | 8/2021 | Sato ......................... H02P 6/08 |

OTHER PUBLICATIONS

Written Opinion for PCT/FR2018/053566 dated May 9, 2019.
Search Report for French application No. FR1850013 dated Sep. 17, 2018.

* cited by examiner

BRAKE ACTUATOR AND ASSOCIATED CONTROL METHOD

CROSS-REFERENCE TO RELATED APPLICATIONS

This is a National Stage of PCT international application PCT/FR2018/053566, filed on Dec. 28, 2018, which claims the priority of French Patent Application No. 1850013, filed Jan. 2, 2018, both of which are incorporated herein by reference in their entirety.

TECHNICAL FIELD

The present invention relates to a brake actuator including a braking member, the braking member including a direct current motor and a braking pad, the motor comprising a shaft and being configured to movably drive the braking pad during rotation of the shaft.

The invention is applicable to the braking field, and more particularly to braking the wheels of a vehicle.

STATE OF PRIOR ART

It is known to provide a vehicle wheel, especially for a land vehicle, with a brake actuator, for cooperating with a brake disc attached to said wheel, for the purpose of rotatably locking the wheel.

It is also known to compute the clamping force exerted by the actuator on the disc, and to control the operation of the actuator according to the computed value of the clamping force.

For example, in the case of an actuator in which the clamping force is provided by an electric motor, it is known to measure a current drawn by the motor and a rotational speed of a motor shaft to compute the clamping force.

However, such an actuator is not entirely satisfactory.

Indeed, in such an actuator, the estimated value of the clamping force may prove incorrect, especially due to inaccuracies in measuring the current drawn and the rotational speed of the shaft. This leads to the application, on the brake disc, of too high a force, resulting in an electric energy overconsumption and an accelerated deterioration of the actuator components, or in the application of an insufficient force, resulting in an insufficient clamping and a possible rotation of the corresponding wheel.

One purpose of the invention is therefore to provide a brake actuator having a greater reliability.

DISCLOSURE OF THE INVENTION

To that end, one object of the invention is a brake actuator of the aforesaid type, including a calculator configured to:
  measure, over time, a current drawn by the motor and a voltage between the terminals of the motor;
  implement a Kalman filter to compute, from the measured current and voltage, a filtered current drawn by the motor and a filtered rotational speed of the shaft of the motor;
  compute, from the value of the filtered current drawn by the motor and the value of the filtered rotational speed of the shaft of the motor, a clamping force which is produced by the actuator;
  control switching off the motor when the computed value of the clamping force reaches a predetermined set point.

Indeed, implementing the Kalman filter reduces the noise affecting the measurement of the current drawn by the motor and the voltage across its terminals, which results in a more reliable estimation of the clamping force exerted by the brake actuator. This results in applicating, on the braking pad, a force substantially equal to the desired clamping force, which makes the brake actuator according to the invention more reliable than brake actuators of the state of the art. Furthermore, as a result of the above, a better management of the motor electric consumption and a longer lifetime of the actuator components are achieved.

According to further advantageous aspects of the invention, the brake actuator includes one or more of the following characteristics, taken alone or according to any technically possible combinations:
  the braking member further includes a reducer arranged between the motor shaft and the braking pad, the braking pad being attached to an output screw of the reducer, the calculator being configured to compute the clamping force as:

$$F = 2\pi \left[ K \cdot (i - i_0) - J \frac{d\omega}{dt} - f(\omega - \omega_0) \right] \frac{\eta \cdot r}{S}$$

where F is the clamping force, expressed in N;
K is an electromotive force constant of the motor;
J is a moment of inertia of the motor;
f is a viscous friction coefficient of the motor;
$\eta$ is an efficiency of the braking member;
r is a reducer ratio of the reducer;
S is a pitch of the output screw of the reducer;
d/dt is the "time derivative" operator;
i is the filtered current drawn by the motor;
$i_0$ is a no-load current of the braking member;
$\omega$ is the filtered angular rotational speed of the shaft of the motor; and
$\omega_0$ is a no-load angular rotational speed of the braking member;
  the calculator is configured to determine the no-load current and the no-load angular rotational speed from measured values of the current drawn by the motor and the voltage across the electric terminals of the motor for a time interval during which the motor has a steady state operation;
  the Kalman filter has a state model given by:

$$\begin{cases} \frac{dx}{dt} = Ax + Bu \\ y = Cx + Du \end{cases}$$

where x is a state vector of the braking member 6, expressed as:

$$x = \begin{pmatrix} i \\ \omega \end{pmatrix}$$

i being the current drawn by the motor; and
$\omega$ being the angular rotational speed of the shaft of the motor;

where u is an input control vector, expressed as:

$$u = \begin{pmatrix} U \\ C_u \end{pmatrix}$$

U being the voltage measured across the terminals of the motor; and $C_u$ being an effective torque of the shaft of the motor;

where A is a state transition matrix of the Kalman filter, expressed as:

$$A = \begin{pmatrix} -\dfrac{R}{L} & -\dfrac{K}{L} \\ -\dfrac{K}{J} & -\dfrac{f}{J} \end{pmatrix}$$

with R an internal resistance of the motor;
K a magnetic constant of the motor;
J a moment of inertia of the motor;
f a viscous friction coefficient of the motor; and
L an internal inductance of the motor;
where B is a control input matrix of the Kalman filter, expressed as:

$$B = \begin{pmatrix} \dfrac{1}{L} & 0 \\ 0 & -\dfrac{1}{J} \end{pmatrix}$$

and where C and D are matrices being respectively:

$C = (1 \; 0)$ $D = (0 \; 0)$ the calculator is configured to:
allow the motor to be supplied with electric energy from an initial instant corresponding to receiving a command for switching on the actuator;
store the value of the electric current drawn by the motor for a time interval between the initial instant and a subsequent final instant;
optimise parameters of a predetermined model to determine a value of an internal resistance of the motor and/or a value of a magnetic constant of the motor;
update the coefficients of a state transition matrix of the Kalman filter as a function of the determined value of the internal resistance of the motor and/or the determined value of the magnetic constant of the motor;
the Kalman filter involves a quantity equal to:

$$A_d^* = I + \sum_{p=1}^{m} \frac{(A \cdot T_e)^p}{p!}$$

where A is a state transition matrix of the Kalman filter;
$T_e$ is a time interval separating two successive estimations of a state vector of the Kalman filter;
I is the "identity" matrix the rank of which is equal to the rank of the state transition matrix;
"!" is the "factorial" operator; and
m is a predetermined non-zero natural integer;
the calculator being configured to successively compute the powers of the term $(A.T_e)$, in the ascending order of the powers, a given power $(A.T_e)^p$, p being any integer comprised between 1 and m, being obtained by multiplying the immediately lower power $(A.T_e)^{p-1}$ previously computed by the term $(A.T_e)$.

Furthermore, one object of the invention is a method for controlling a brake actuator, the actuator including a direct current motor and a braking pad, the motor comprising a shaft being configured to movably drive the braking pad during rotation of the shaft, the method including the steps of:
supplying the motor with electric energy;
measuring, over time, a current drawn by the motor and a voltage across terminals of the motor;
computing, from the measured current and voltage, and by implementing a Kalman filter, a filtered current drawn by the motor and a filtered rotational speed of the shaft of the motor;
computing, from the value of the filtered current drawn by the motor and the value of the filtered rotational speed of the shaft of the motor, a clamping force which is produced by the actuator; and
controlling switching off the motor when the computed value of the clamping force reaches a predetermined set point.

BRIEF DESCRIPTION OF THE DRAWINGS

The invention will be better understood using the following description, given purely by way of non-limiting example and made with reference to the appended drawings in which.

DETAILED DISCLOSURE OF PARTICULAR EMBODIMENTS

Figure 1:
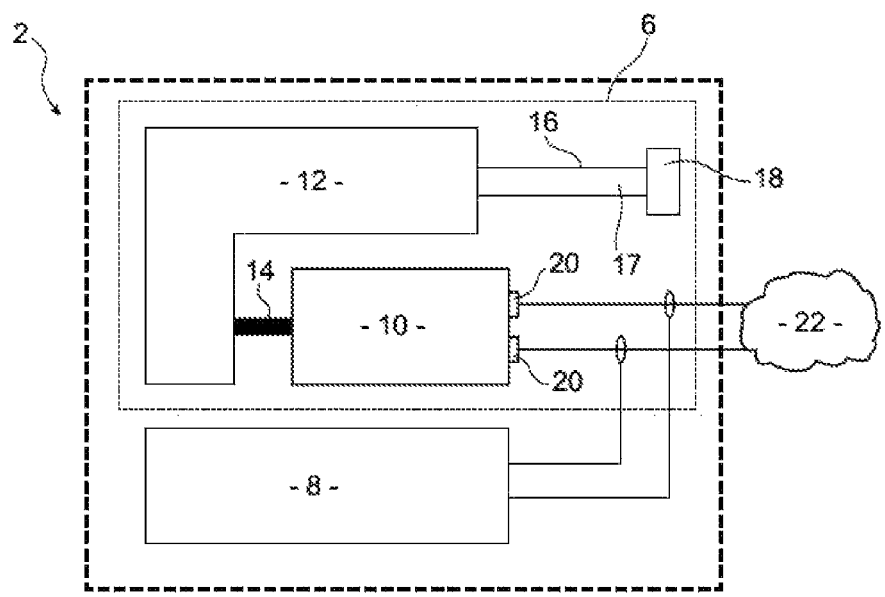
FIG. 1 is a schematic representation of a brake actuator according to the invention.

A brake actuator 2 is represented in FIG. 1.

The actuator 2 is on board a vehicle to rotatably lock a corresponding wheel of the vehicle. The actuator 2 is an electric or electric and hydraulic brake actuator, for use as a service brake and/or parking brake.

The actuator 2 includes a braking member 6 and a calculator 8 for driving the operation of the braking member 6.

The braking member 6 is configured to move a braking pad 18 of the braking member 6 in order to bring the braking pad 18 in contact with a disc attached to the wheel associated with the actuator 2, for the purpose of rotatably locking said wheel.

Furthermore, the calculator 8 is configured to control the operation of the braking member 6.

The braking member 6 includes a motor 10, a reducer 12 and the braking pad 18.

The motor 10 is an electric motor, more precisely a direct current electric motor.

The motor 10 includes a shaft 14 connected to the reducer 12.

The motor 10 also includes electric terminals 20 for being connected to an electric energy source 22 able to supply the motor 10 with electric energy. The electric energy source 22 is, for example, a voltage bus of the vehicle.

The reducer 12 comprises an output screw 16 a free end 17 of which is attached to the braking pad 18. The output screw 16 is rotatably locked, so that a rotation of the shaft 14 of the motor 10 leads to a translation of the output screw 16, and therefore to a translation of the braking pad 18.

The calculator 8 is configured to control electric energy supply to the motor 10. More precisely, the calculator 8 is configured to control electric energy supply to the motor 10 in order to operate the motor 10 (case where the motor 10 is supplied with electric energy) or to switch off the motor 10 (case where the electric energy supply to the motor 10 is stopped).

The calculator 8 is also configured to measure, over time, the value of the electric current i drawn by the motor 10. The calculator 8 is further configured to measure the value of the electric voltage U across the terminals 20 of the motor 10.

The calculator 8 is also configured to compute, over time, an angular rotational speed ω of the shaft 14 of the motor 10. Computation of the angular rotational speed ω of the shaft 14 of the motor 10 will be described subsequently.

The calculator 8 is further configured to compute, at any time, a clamping force produced by the actuator 2. More particularly, the calculator 8 is configured to compute the clamping force according to the following formula (1):

$$F = 2\pi \left[ K \cdot (i - i_0) - J \frac{d\omega}{dt} - f(\omega - \omega_0) \right] \frac{\eta \cdot r}{S} \quad (1)$$

where F is the clamping force, expressed in N (newton);
K is an electromotive force constant of the motor 10, also called "magnetic constant", expressed in $N.m.A^{-1}$ (newton meter per ampere);
J is a moment of inertia of the motor 10, expressed in $N.m.s^2.rad^{-1}$ (newton metre squared second per radian);
f is a viscous friction coefficient of the motor 10, expressed in $N.m.s.rad^{-1}$;
n is a dimensionless efficiency of the braking member 6;
r is a dimensionless reducer ratio of the reducer 12;
S is a pitch of the output screw 16 of the reducer 12, expressed in m;
d/dt is the "time derivative" operator;
i, the current drawn by the motor 10, is expressed in A;
$i_0$ is a no-load current of the braking member 6, described subsequently;
ω, the angular rotational speed of the shaft 14 of the motor 10 is expressed in $rad.s^{-1}$; and
$\omega_0$ is a no-load angular rotational speed of the braking member 6, described subsequently.

The moment of inertia J, the viscous friction coefficient f, the efficiency n, the reducer ratio r and the screw pitch S have predetermined values, characteristic of the actuator 2 and recorded in a memory of the calculator 8.

Furthermore, the magnetic constant K has a value which is either predetermined, or computed by the calculator 8, as will be described subsequently.

For computing the value of the clamping force F over time, the calculator 8 is configured to implement a Kalman filter.

More precisely, the calculator 8 is configured to implement a Kalman filter having a state model given by the following relationship (2):

$$\begin{cases} \frac{dx}{dt} = Ax + Bu \\ y = Cx + Du \end{cases} \quad (2)$$

the noise components being not noted.

In the relationship (2), x is a state vector of the braking member 6, expressed as follows:

$$x = \begin{pmatrix} i \\ \omega \end{pmatrix}$$

Furthermore, u is an input control vector, expressed as follows:

$$u = \begin{pmatrix} U \\ C_u \end{pmatrix}$$

where U, the voltage across the terminals 20 of the motor 10, is expressed in V (volt); and
$C_u$ is an effective torque of the shaft 14 of the motor 10, expressed in N.m. The effective torque $C_u$ is obtained according to:

$$C_u = K(i - i_0)$$

The amount y is a measurement vector of the Kalman filter, equal to the current i drawn by the motor 10 and measured by the calculator 8.

Furthermore, A, B, C and D are matrices the values of which are given hereafter:

$$A = \begin{pmatrix} -\frac{R}{L} & -\frac{K}{L} \\ -\frac{K}{J} & -\frac{f}{J} \end{pmatrix}$$

$$B = \begin{pmatrix} \frac{1}{L} & 0 \\ 0 & -\frac{1}{J} \end{pmatrix}$$

$$C = (1 \quad 0)$$

$$D = (0 \quad 0)$$

Matrix A is generally called a "state transition matrix". Furthermore, matrix B is generally called a "control input matrix".

R is an internal resistance of the motor 10. Furthermore, L is an internal inductance of the motor 10.

The internal inductance L has a predetermined value, characteristic of the motor 10 and recorded in the memory of the calculator 8.

Furthermore, the internal resistance R has a value which is either predetermined, or computed by the calculator 8, as will be described subsequently.

With such a filter, the calculator 8 is configured to implement, successively over time, a prediction step known to the Kalman filter.

Conventionally, during the prediction step, a predicted value of the state vector x for a given computation instant, referenced by an integer index k and referred to as the term "instant k", is computed according to the following relationship (3):

$$\hat{x}_{k|k-1} = e^{(A \cdot T_e)} \hat{x}_{k-1|k-1} + (\int_0^{T_e} e^{(A \cdot t)} B dt) u_{k-1} \quad (3)$$

where $\hat{x}_{k|k-1}$ is the predicted value of the state vector x at the instant k;

$\hat{x}_{k-1|k-1}$ is an estimated value of the state vector x at a previous computation instant, referenced by the integer index k−1 and referred to as the term "instant k−1";

$u_{k-1}$ is the measured value of the input control vector at the instant k−1;

$T_e$ is the amount of time elapsed between the instant k−1 and the instant k; and e is the "exponential" function.

However, the calculator 8 is advantageously configured to determine the value, over time, of the state vector x by carrying out an approximation based on the relationship (3).

More precisely, the calculator 8 is configured to compute an approximate value of the terms $e^{(A.T_e)}$, noted as $A_d$, and $\int_0^{T_e} e^{(At)}.B dt$, noted as $B_d$.

In particular, the calculator 8 is configured to determine an approximate value $A_d^*$ of the term $A_d$ by computing the first terms of the power series expansion of the term $A_d$. More precisely:

$$A_d^* = I_2 + \sum_{p=1}^{m} \frac{(A \cdot T_e)^p}{p!}$$

where $I_2$ is the identity matrix of rank 2;

"!" is the "factorial" operator; and m is a predetermined non-zero natural integer.

Preferably, in order to compute the approximate value $A_d^*$, the calculator 8 is configured to implement the following steps.

During an initialisation step, the calculator 8 creates, in the memory of the calculator 8, a first array G and a second array H, each having a dimension (1, m+1).

And then, during a preliminary computation step, the calculator 8 writes the value "1" into the box G(1,1) of the first array G. Furthermore, in each of the other boxes of the first array G, the calculator 8 writes a value such as:

$$G(1, p) = \frac{1}{p-1}$$

In this case, at the end of the preliminary computation step, the first array G is written as:

| 1 | 1/1 | 1/2 | ... | 1/p | ... | 1/m |
|---|-----|-----|-----|-----|-----|-----|

And then, during an intermediate computation step, the calculator 8 writes the identity matrix of order 2 in the box H(1,1) of the second array H.

And then, the calculator 8 recursively writes, from the box of rank (1, 2) to the box of rank (1, m+1) of the second array H, a value computed according to the following formula:

$H(1,p)=G(1,p).H(1,p-1)\times A.T_e$ where "×" indicates a matrix multiplication.

In this case, at the end of the intermediate computation step, the second array H is written as:

| $I_2$ | $A \cdot T_e$ | $(A \cdot T_e)^2/2!$ | ... | $(A \cdot T_e)^p/p!$ | ... | $(A \cdot T_e)^m/m!$ |
|---|---|---|---|---|---|---|

Then, during a final computation step, the calculator 8 adds the values of each of the boxes of the second array H in order to obtain the approximate value $A_d^*$. The approximate value $A_d^*$ is iteratively computed.

Furthermore, the calculator 8 is configured to determine an approximate value $B_d^*$ of the term $B_d$ by computing the first terms of the power series expansion of the term $B_d$. More precisely:

$$B_d^* = \left(I_2 \cdot T_e + \sum_{p=1}^{n} \frac{(A \cdot T_e)^p}{p!} \cdot \frac{T_e}{p+1}\right) \times B$$

where n is a predetermined non-zero natural integer.

Preferably, the integers m and n are equal to each other. In this case, the calculator 8 is also configured to also create, in the memory of the calculator 8, a third array Q and a fourth array Z, each having a dimension (1, m+1).

Furthermore, during the preliminary computation step, the calculator 8 writes, in each box of the third array Q a value such as:

$$Q(1, p) = \frac{1}{p}$$

so that, at the end of the preliminary computation step, the third array Q is written as:

| 1/1 | 1/2 | 1/3 | ... | 1/p | ... | 1/(m + 1) |
|---|---|---|---|---|---|---|

Furthermore, during the intermediate computation step, the calculator 8 writes, in each box of the fourth array Z, a value such that:

$Z(1,p)=H(1,p).Q(1,p).T_e$

At the end of the intermediate computation step, the fourth array Z is written as:

| $I_2 \cdot T_e$ | $A \cdot T_e^2/2!$ | $A^2 \cdot T_e^3/3!$ | ... | $A^p \cdot T_e^{p+1}/(p+1)!$ | ... | $A^m \cdot T_e^{m+1}/(m+1)!$ |
|---|---|---|---|---|---|---|

Furthermore, during the final computation step, the calculator 8 adds the values of each of the boxes of the fourth array Z, and then multiplies on the right the result obtained by matrix B in order to obtain the approximate value $B_d^*$.

Preferably, the calculator 8 is configured to determine the value of the internal resistance R of the motor 10. In this case, the calculator is advantageously configured to also determine the value of the magnetic constance K of the motor 10.

More precisely, starting from a state where the actuator 2 is idle, that is a state where the actuator 2 does not cooperate with the brake disc of the corresponding wheel to rotatably lock said wheel, the calculator 8 is configured to allow the motor 10 to be supplied with electric energy from an initial instant t, corresponding to receiving a command for switching on the actuator 2.

Figure 2:
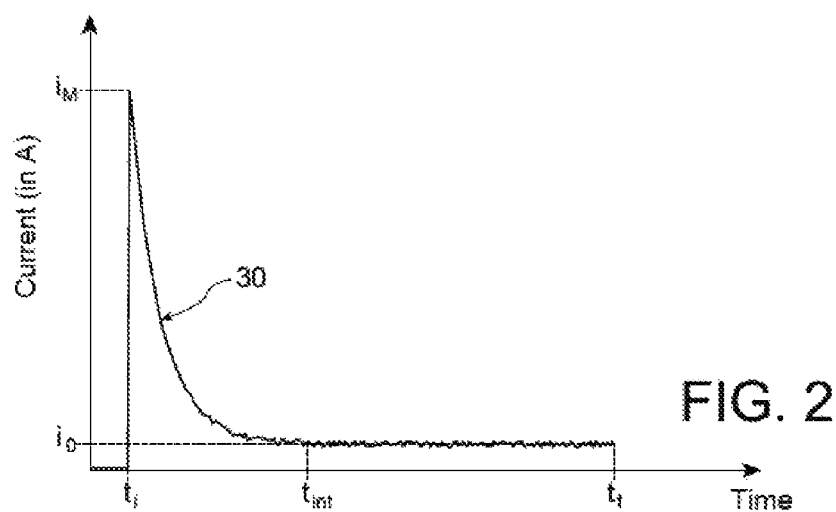
FIG. 2 is a graph representing time variation of an electric current drawn by a motor of the actuator of FIG. 1, during a start phase of the motor.

The calculator 8 is also configured to acquire the value of the electric current i drawn by the motor 10 during a time interval between the initial instant t, and a final instant $t_f$. Furthermore, the calculator 8 is configured to acquire the value of the voltage U across the terminals 20 of the motor 10 between the initial instant t, and the final instant $t_f$. The curve 30 of FIG. 2 illustrates the variation in the current i drawn by the motor between the initial instant t, and the final instant $t_f$.

The final instant $t_f$ is chosen so that, at the final instant $t_f$, the braking pad 18 has not yet contacted the disc of the corresponding wheel.

Furthermore, the final instant $t_f$ is chosen so that, at the final instant $t_f$, the motor 10 operates in steady state.

The calculator 8 is further configured to optimise the parameters of a predetermined model to minimise a predetermined cost function. Preferably, the predetermined model is written as:

$$i(t) = i_0 + (i_M - i_0)e^{-\tau}$$

where t is any instant between the initial instant $t_i$ and the final instant $t_f$;

$i_0$ is the no-load current of the braking member 6;

$i_M$ is the maximum value of the current, obtained at the initial instant $t_i$; and $\tau$ is a time constant representative of the internal resistance R and of the magnetic constant K of the motor 10.

For example, such an optimisation is achieved by recursively applying the least square method.

The no-load current $i_0$ is the current drawn by the motor 10 in steady state, before the braking pad 18 reaches the disc.

For example, the value of the no-load current $i_0$ is the mean value of the current drawn by the motor 10 between an intermediate instant $t_{int}$, subsequent to the initial instant $t_i$, and the final instant $t_f$. The intermediate instant $t_{int}$ is chosen so that the motor 10 can be considered as operating in steady state from the intermediate instant $t_{int}$.

Furthermore, the no-load angular rotational speed $\omega_0$ is the angular speed of the braking member 6, in steady state, before the braking pad 18 reaches the corresponding disc.

The calculator 8 is further configured to compute the value of the internal resistance R by applying the following relationship (4):

$$R = \frac{U(t_i)}{i_M} \quad (4)$$

where $U(t_i)$ is the value of the voltage U at the instant $t_i$.

Furthermore, the calculator 8 is configured to compute the value of the magnetic constant K by applying the following relationship (5):

$$K = \sqrt{\frac{RJ}{\tau}} \quad (5)$$

Furthermore, the calculator 8 is configured to stop electric energy supply to the motor 10 when the value of the clamping force F exerted by the braking member 6 reaches a predetermined set point.

The set point typically corresponds to a minimum clamping force required to rotatably lock the wheel with which the actuator 2 is associated.

The operation of the actuator 2, starting from a state where the actuator 2 is idle, will now be described.

When a user controls switching on the actuator 2, for example by depressing a brake pedal of the vehicle, or by actuating a hand brake of the vehicle, the calculator 8 allows, at the initial instant $t_i$, the motor 10 to be supplied with electric energy.

In this case, the shaft 14 of the motor 10 drives the reducer 12, the output screw 16 of which advances the braking pad 18 towards the disc of the corresponding wheel.

Advantageously, from the initial instant $t_i$, and until the final instant $t_f$, the calculator 8 acquires the value of the current i drawn by the motor 10 and of the voltage U across the terminals 20 of the motor 10.

And then, the calculator 10 determines the value of the internal resistance R and of the magnetic constant K of the motor 10.

Furthermore, the calculator 8 determines the value of the no-load current $i_0$ and of the no-load angular rotational speed $\omega_0$.

Then, the calculator 8 updates the coefficients of the state transition matrix A with the values determined for the internal resistance R and the magnetic constant K of the motor 10.

Then, the calculator 8 computes the approximate quantities $A_d^*$ and $B_d^*$ for the Kalman filter.

Then, from the values of the voltage U across the terminals 20 of the motor 10 and of the current i drawn by the motor 10 which are measured over time, the calculator 8 implements the Kalman filter to determine, over time, a filtered value of the current drawn by the motor 10, as well as a filtered value of the angular rotational speed $\omega$ of the shaft 14 of the motor 10. In particular, over time, the filtered value of the current drawn by the motor 10 is equal to the first component of the state vector computed, and the filtered value of the angular rotational speed $\omega$ of the shaft 14 of the motor 10 is equal to the second component of the state vector computed.

Furthermore, from the filtered values of the current i drawn by the motor 10 and the angular rotational speed $\omega$ of the shaft 14 of the motor 10 which are provided by the Kalman filter, the calculator 8 determines, over time, the clamping force F exerted by the actuator 2.

As long as the braking pad 18 has not contacted the corresponding disc, the current i drawn by the motor 10 is equal to the no-load current $i_0$ and the angular rotational speed of the shaft 14 is equal to the no-load angular speed $\omega_0$, so that the clamping force F is zero.

As soon as the braking pad 18 contacts the corresponding disc, the clamping force increases.

When the value of the clamping force reaches the predetermined set point, the calculator 8 controls switching off electric energy supply to the motor 10.

NOMENCLATURE

2: actuator
6: braking member
8: calculator
10: motor
12: reducer
14: shaft
16: output screw
17: free end of the output screw
18: braking pad
20: electric terminals

What is claimed is:
1. A brake actuator, comprising a braking member, the braking member including a direct current motor and a braking pad,
the direct current motor comprising a shaft and being configured to movably drive the braking pad during rotation of the shaft, the brake actuator further comprising a calculator configured to:
measure, over time, a current drawn by the direct current motor and a voltage across terminals of the direct current motor;
implement a Kalman filter to compute, from the measured current and voltage, a filtered current drawn by the direct current motor and a filtered rotational speed of the shaft of the direct current motor;
compute, from a value of the filtered current drawn by the direct current motor and a value of the filtered rotational speed of the shaft of the direct current motor, a clamping force which is produced by the brake actuator;
control switching the direct current motor off when a value of the computed clamping force reaches a predetermined set point.

2. The brake actuator according to claim 1, wherein the braking member further includes a reducer arranged between the shaft of the direct current motor and the braking pad, the braking pad being attached to an output screw of the reducer,
and wherein the calculator is configured to compute the clamping force as:

$$F = 2\pi \left[ K \cdot (i - i_0) - J \frac{d\omega}{dt} - f(\omega - \omega_0) \right] \frac{\eta \cdot r}{S}$$

where F is the clamping force, expressed in N;
K is an electromotive force constant of the direct current motor;
J is a moment of inertia of the direct current motor;
f is a viscous friction coefficient of the direct current motor;
$\eta$ is an efficiency of the braking member;
r is a reducer ratio of the reducer;
S is a pitch of the output screw of the reducer;
d/dt is a "time derivative" operator;
i is the filtered current drawn by the direct current motor;
$i_0$ is a no-load current of the braking member;
$\omega$ is the filtered rotational speed of the shaft of the direct current motor; and
$\omega_0$ is a no-load angular rotational speed of the braking member.

3. The brake actuator according to claim 2, wherein the calculator is configured to determine the no-load current and the no-load rotational speed from measured values of the current drawn by the direct current motor and the voltage across the electric terminals of the direct current motor during a time interval during which the direct current motor has a steady state operation.

4. The brake actuator (2) according to claim 1, wherein the Kalman filter has a state model given by:

$$\begin{cases} \frac{dx}{dt} = Ax + Bu \\ y = Cx + Du \end{cases}$$

where x is a state vector of the braking member, expressed as:

$$x = \begin{pmatrix} i \\ \omega \end{pmatrix}$$

i being the current drawn by the direct current motor; and
$\omega$ being the rotational speed of the shaft of the direct current motor;
where u is an input control vector, expressed as:

$$u = \begin{pmatrix} U \\ C_u \end{pmatrix}$$

U being the voltage measured across the terminals of the direct current motor; and
$C_u$ being an effective torque at the shaft of the direct current motor;
where A is a state transition matrix of the Kalman filter, expressed as:

$$A = \begin{pmatrix} -\frac{R}{L} & -\frac{K}{L} \\ -\frac{K}{J} & -\frac{f}{J} \end{pmatrix}$$

with R an internal resistance of the direct current motor;
K a magnetic constant of the direct current motor;
J a moment of inertia of the direct current motor;
f a viscous friction coefficient of the direct current motor; and
L an internal inductance of the direct current motor;
where B is a control input matrix of the Kalman filter, expressed as:

$$B = \begin{pmatrix} \frac{1}{L} & 0 \\ 0 & -\frac{1}{J} \end{pmatrix}$$

and where C and D are matrices being respectively:
C=(1 0)
D=(0 0).

5. The brake actuator according to claim 1, wherein the calculator is configured to:
allow the direct current motor to be supplied with electric energy from an initial instant corresponding to receiving a command for switching on the brake actuator;
store a value of the electric current drawn by the direct current motor during a time interval between the initial instant and a subsequent final instant;
optimise parameters of a predetermined model to determine a value of an internal resistance of the direct current motor and/or a value of a magnetic constant of the direct current motor;
update coefficients of a state transition matrix of the Kalman filter as a function of the determined value of the internal resistance of the direct current motor and/or the determined value of the magnetic constant of the direct current motor.

6. The brake actuator according to claim 1, wherein the Kalman filter involves a quantity equal to:

$$A_d^* = I + \sum_{p=1}^{m} \frac{(A \cdot T_e)^p}{p!}$$

where A is a state transition matrix of the Kalman filter;
$T_c$ is a time interval separating two successive estimations of a state vector of the Kalman filter;
I is an "identity" matrix the rank of which is equal to the rank of the state transition matrix;
"!" is a "factorial" operator; and
m is a predetermined non-zero natural integer;
and wherein the calculator is configured to successively compute the powers of the term $(A.T_c)$, in the ascending order of the powers, a given power $(A.T_c)^p$, p being any integer between 1 and m, being obtained by multiplying the immediately lower power $(A.T_c)^{p-1}$ previously computed by the term $(A.T_c)$.

7. A method for controlling a brake actuator, the brake actuator comprising a direct current motor and a braking pad, the direct current motor comprising a shaft being configured to movably drive the braking pad during rotation of the shaft, the method including the steps of:
supplying the direct current motor with electric energy;
measuring, over time, a current drawn by the direct current motor and a voltage across terminals of the direct current motor;
computing, from the measured current and voltage, and by implementing a Kalman filter, a filtered current drawn by the direct current motor and a filtered rotational speed of the shaft of the direct current motor;
computing, from a value of the filtered current drawn by the direct current motor and a value of the filtered rotational speed of the shaft of the direct current motor, clamping force which is produced by the brake actuator; and
controlling switching the direct current motor off when a value of the computed clamping force reaches a predetermined set point.

* * * * *